(12) United States Patent
Azarov et al.

(10) Patent No.: US 6,768,571 B2
(45) Date of Patent: Jul. 27, 2004

(54) ORIENTATION STABILIZATION FOR MEMS DEVICES

(75) Inventors: Alexei V. Azarov, Old Bridge, NJ (US); Randy C. Giles, Whippany, NJ (US); Wendelin Weingartner, New York City, NY (US)

(73) Assignee: Lucent Technologies Inc., Murray Hill, NJ (US)

(*) Notice: Subject to any disclaimer, the term of this patent is extended or adjusted under 35 U.S.C. 154(b) by 15 days.

(21) Appl. No.: 10/261,167

(22) Filed: Sep. 30, 2002

(65) Prior Publication Data

US 2004/0061925 A1 Apr. 1, 2004

(51) Int. Cl.[7] .................................. G02F 1/01; G02B 26/08
(52) U.S. Cl. ................................... 359/239; 359/224
(58) Field of Search .............................. 359/239, 212, 359/224, 223

(56) References Cited

U.S. PATENT DOCUMENTS

| | | | |
|---|---|---|---|
| 5,648,618 A | | 7/1997 | Neukermans et al. .... 73/862.08 |
| 6,201,631 B1 | | 3/2001 | Greywall ..................... 359/245 |
| 6,275,326 B1 | * | 8/2001 | Bhalla et al. ................ 359/298 |
| 6,480,645 B1 | * | 11/2002 | Peale et al. .................... 385/18 |
| 6,549,692 B1 | * | 4/2003 | Harel et al. ..................... 385/18 |
| 6,567,574 B1 | * | 5/2003 | Ma et al. ........................ 385/16 |
| 2002/0070335 A1 | * | 6/2002 | Orcutt et al. ................ 250/234 |
| 2003/0141439 A1 | * | 7/2003 | Heminger et al. ........... 250/221 |

* cited by examiner

Primary Examiner—David N. Spector

(57) ABSTRACT

A control circuit designed to control driving voltages applied to the actuating electrodes of a MEMS mirror. The control circuit is interfaced with a mirror position sensor and includes a variable gain amplifier whose output depends on a desired mirror equilibrium angle and a current mirror tilt angle determined by the sensor. The desired equilibrium angle can be changed by varying a reference signal applied to the amplifier. The control circuit can stabilize the mirror at relatively large tilt angles and, as a result, extend the available angular range beyond the snap-down angle. Since the number of MEMS mirrors that can be arrayed in an optical cross-connect is a function of the available angular range, the number of channels in a cross-connect may be substantially increased.

19 Claims, 9 Drawing Sheets

ORIENTATION STABILIZATION FOR MEMS DEVICES

BACKGROUND OF THE INVENTION

1. Field of the Invention

The invention relates to optical communication equipment and, more specifically, to micro-electromechanical devices for use in such equipment.

2. Description of the Related Art

Optical communication equipment often employs micro-electromechanical systems (MEMS). A typical MEMS system may include an array of micro-machined mirrors, each mirror individually movable in response to an electrical signal. Such an array may be employed in an optical cross-connect, in which each mirror in the array receives a beam of light, for example, from an input optical fiber. The beam is reflected from the mirror and can be redirected to a different location, e.g., at which is located an output optical fiber, by rotating the mirror. More details on the principle of operation and methods of manufacture of MEMS devices including mirror arrays may be found, for example, in commonly assigned U.S. Pat. No. 6,201,631, the teachings of which are incorporated herein by reference.

One problem with prior art MEMS devices is referred to as "snap-down." More specifically, when the voltage applied to an actuating electrode in such device approaches a critical value, the tilt angle of the mirror begins to increase rapidly and nonlinearly with the voltage. This behavior may cause a collision of the mirror against the electrode and/or wafer, damaging the mirror and rendering the MEMS device inoperable.

SUMMARY OF THE INVENTION

The problems in the prior art are addressed, in accordance with the principles of the invention, by a control circuit that controls the voltages applied to the one or more actuating electrodes of a MEMS device. The control circuit receives a sensor signal, e.g., from a position sensor corresponding to a MEMS device, indicative of the current position of a movable part of the MEMS device relative to a stationary part of the MEMS device. Based on the sensor signal, the control circuit generates a control signal for the MEMS device actuator to achieve a desired orientation of the movable part with respect to the stationary part. The control circuit may include a variable gain amplifier whose output depends on the sensor signal and a reference signal corresponding to a desired equilibrium position for the movable part. The desired equilibrium angle can be changed by adjusting the reference signal applied to the amplifier.

In a MEMS device in which the movable part is a mirror that is rotatably coupled to the stationary part, the control circuit can stabilize the mirror at relatively large tilt angles and, as a result, extend the available angular range beyond the snap-down angle. Since the number of MEMS device mirrors that can be arrayed in an optical cross-connect is a function of the available angular range, in accordance with the principles of the invention, the number of channels in a cross-connect may be substantially increased.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1B:
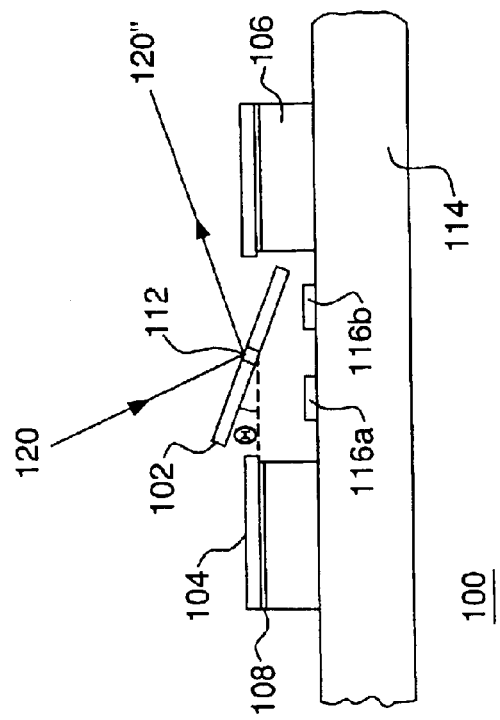
FIGS. 1A–B illustrate cross-sectional views of a representative MEMS device that may be used in an optical cross-connect.
Figure 1A:
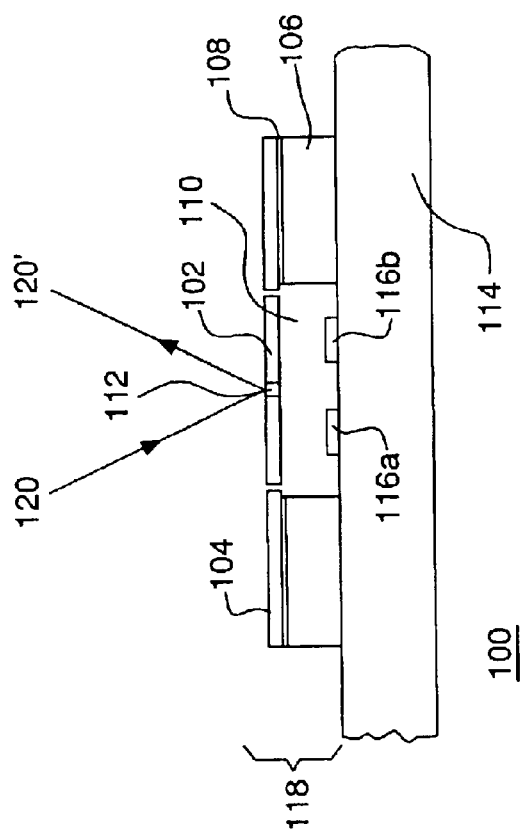

FIG. 1A shows a cross-sectional view of a representative MEMS device 100 that may be used in an optical cross-connect. Device 100 has a movable mirror 102 formed in an overlayer 104 of a wafer 118 using, e.g., reactive etching. Wafer 118 has two additional layers: a substrate layer 106 and a thin insulating layer 108. Layer 108 electrically isolates overlayer 104 from substrate layer 106. Overlayer 104 and substrate layer 106 may be silicon, and insulating layer 108 may be silicon oxide. Mirror 102 is supported above a cavity 110 by a pair of springs 112, e.g., torsional members, connected to overlayer 104. Cavity 110 is defined in insulating layer 108 and substrate layer 106. A second wafer 114 includes electrodes 116a–b as well as electrical interconnections (not shown). Substrate layer 106 is attached to wafer 114 such that electrodes 116a–b are located beneath mirror 102 in cavity 110. Mirror 102 and electrodes 116a–b form an actuator of device 100.

FIG. 1B illustrates how a beam of light 120 impinging on mirror 102 can be redirected from direction 120 (FIG. 1A) to direction 120 using mirror rotation. Mirror 102 rotates about the axis defined by springs 112 in response to voltages applied to electrodes 116a–b. For example, when electrode 116b is biased, mirror 102 rotates clockwise, as shown in FIG. 1B. Similarly, when electrode 116a is biased, mirror 102 rotates counterclockwise. Changing bias voltages changes the rotation angle ($\theta$) thus enabling a cross-connecting function of device 100.

As seen in FIG. 1B, an increase of the rotation angle causes mirror 102 to approach the corresponding actuating electrode, e.g., electrode 116b for the clockwise rotation illustrated in FIG. 1B. As a result, the electrostatic torque exerted onto mirror 102 by electrode 116b at a constant voltage applied to that electrode increases nonlinearly with the angle while the mechanical torque exerted by springs 112 increases substantially linearly. At relatively large rotation angles, this difference in torque behavior may cause mirror instability and/or snap-down as will be further described below.

Figure 2:
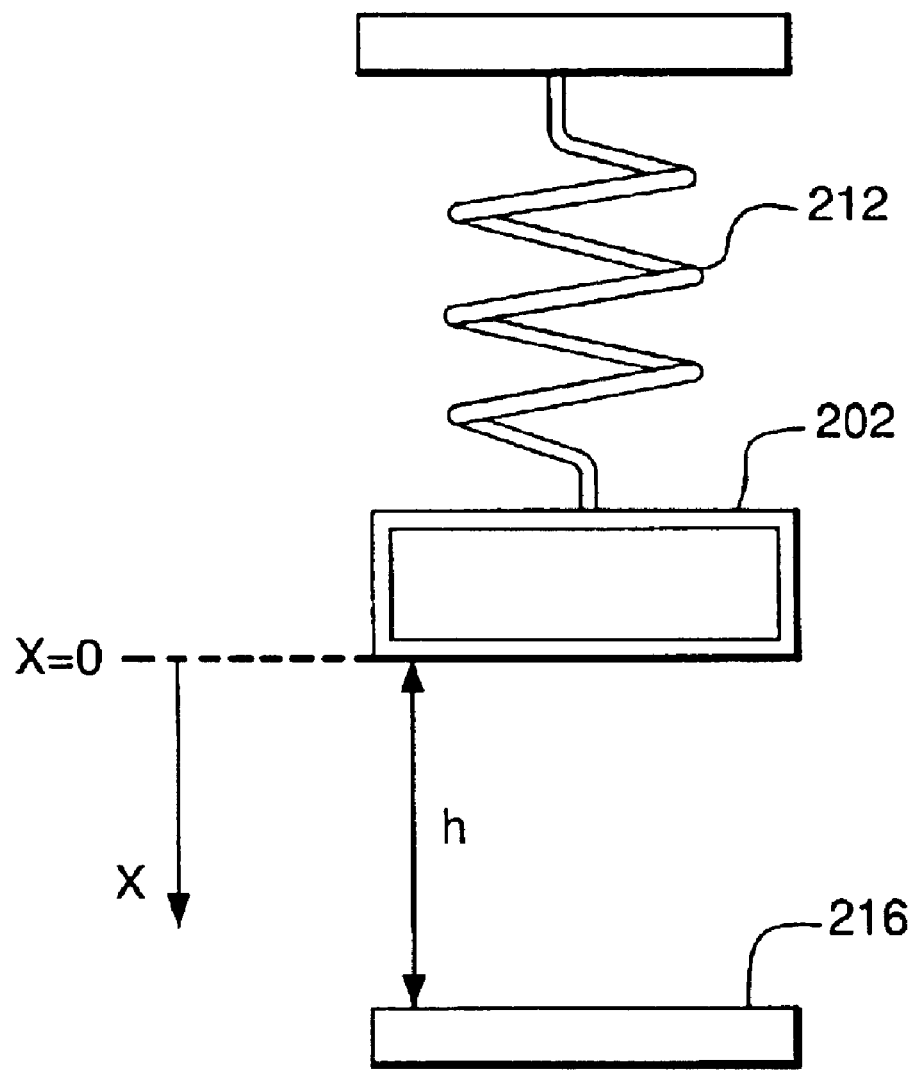
FIG. 2 illustrates a simplified model describing the electrostatic and mechanical torques generated in the device of FIG. 1.

FIG. 2 illustrates a simplified model that may be used to qualitatively describe the behavior of the electrostatic and mechanical torques generated in device 100. In FIG. 2, a plate 202, a spring 212, an electrode 216, and coordinate x correspond to, e.g., mirror 102, springs 112, electrode 116*b*, and angle θ, respectively, in device 100. The mechanical force, $F_m$, acting upon plate 202 is given by Equation (1) as follows:

$$F_m = -kx \quad (1)$$

where k is the spring constant of spring 212 and x=0 corresponds to the non-deformed spring. The electrostatic force, $F_e$, acting upon plate 202 is given by Equation (2) as follows:

$$F_e = \frac{AV^2}{h-x} \quad (2)$$

where A is a positive constant, V is the voltage applied to electrode 216, and h is the distance between plate 202 and electrode 216 when the plate is at x=0. In an equilibrium position, the total force ($F_e + F_m$) acting upon plate 202 is zero as expressed by the following equation:

$$\frac{AV^2}{h-x} - kx = 0 \quad (3)$$

Thus, the coordinates of equilibrium positions can be found by solving Equation (3). Depending on the value of parameter p, Equation (3) may have two, one, or no roots, where p is defined by the following equation:

$$p = h^2 - \frac{4AV^2}{k} \quad (4)$$

In particular, when p>0, Equation (3) has two roots ($x_1$ and $x_2$) given by Equation (5) as follows:

$$x_{1,2} = \frac{1}{2}\left(h \pm \sqrt{p}\right) \quad (5)$$

When p=0, Equation (3) has a single doubly degenerate root $x_{1,2}$=h/2; and, when p<0, Equation (3) has no real roots.

Physically, the case of positive p corresponds to small V. In this case, the first equilibrium position, corresponding to the minus sign in Equation (5), is stable, whereas the second equilibrium position, corresponding to the plus sign, is unstable. In particular, in the vicinity of the first equilibrium position, the total force is directed toward that equilibrium position, thus stabilizing plate 202. In contrast, in the vicinity of the second equilibrium position, the total force is directed away from that position. As a result, a small perturbation of the plate coordinate at the second equilibrium position will cause plate 202 to move either toward the first equilibrium position or toward electrode 216.

The case of zero p corresponds to snap-down and the corresponding snap-down voltage ($V_{sd}$) is given as follows:

$$|V_{sd}| = \frac{h}{2}\sqrt{\frac{k}{A}} \quad (6)$$

When V=$V_{sd}$, the equilibrium position at x=h/2 is unstable and plate 202 will collapse against electrode 216 from any initial position. Furthermore, the case of negative p corresponds to a relatively large absolute value of V (i.e., $|V|>|V_{sd}|$). In this case, plate 202 has no equilibrium positions and will also collapse against electrode 216.

Figure 3:
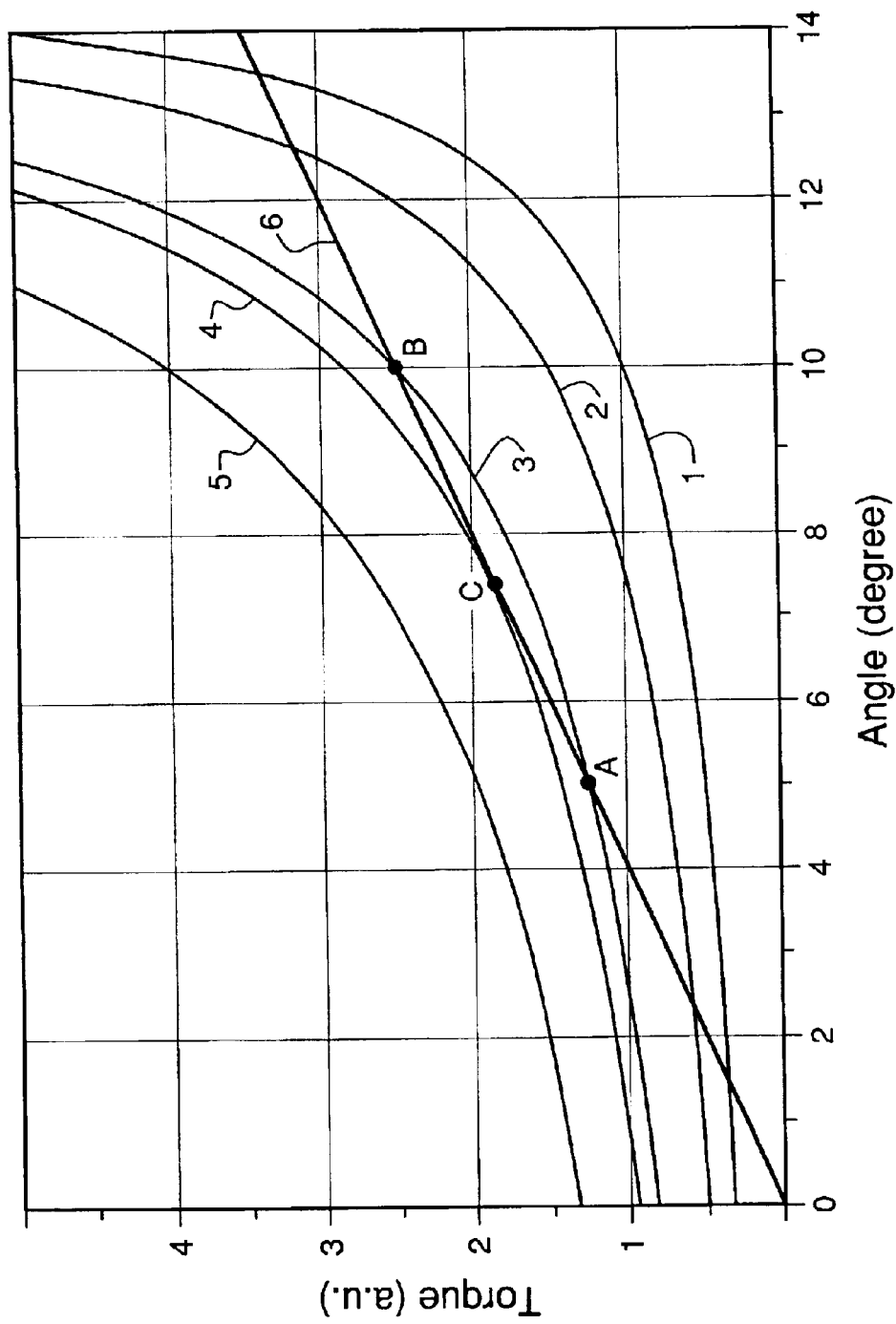
FIG. 3 illustrates graphically the dependence, on the rotation angle, of absolute values of the electrostatic and mechanical torques generated in the device of FIG. 1.

FIG. 3 illustrates graphically the dependence, on angle θ, of absolute values of the electrostatic torque (curves 1 through 5) and mechanical torque (line 6) generated in device 100. Curves 1–5 correspond to different constant voltages, $V_1$–$V_5$, respectively, applied to, e.g., electrode 116*b*, where $|V_1|<|V_2|<|V_3|<|V_4|<|V_5|$. Intersection points of each curve 1–5 with line 6 correspond to equilibrium angles of mirror 102. In agreement with the model of FIG. 2, for each voltage (curve), there may be two, one, or no equilibrium angles (intersection points). For example, if V=$V_3$ (curve 3 in FIG. 3), there are two equilibrium angles ($θ_A$ and $θ_B$) corresponding to points A and B in FIG. 3. If V=$V_4$ (curve 4), there is one equilibrium angle ($θ_C$) corresponding to point C; and, if V=$V_5$ (curve 5), there are no equilibrium angles. Angle $θ_A$ (≈5 degrees) is a stable equilibrium angle, whereas angles $θ_B$ (≈10 degrees) and $θ_C$ (≈7.3 degrees) are unstable equilibrium angles. From angle θ=$θ_B$, mirror 102 will either move toward electrode 116*b* or be drawn toward the stable equilibrium position at θ=$θ_A$. Angle $θ_C$ and voltage $V_4$ are the snap-down angle and voltage, respectively, for device 100.

Figure 4:
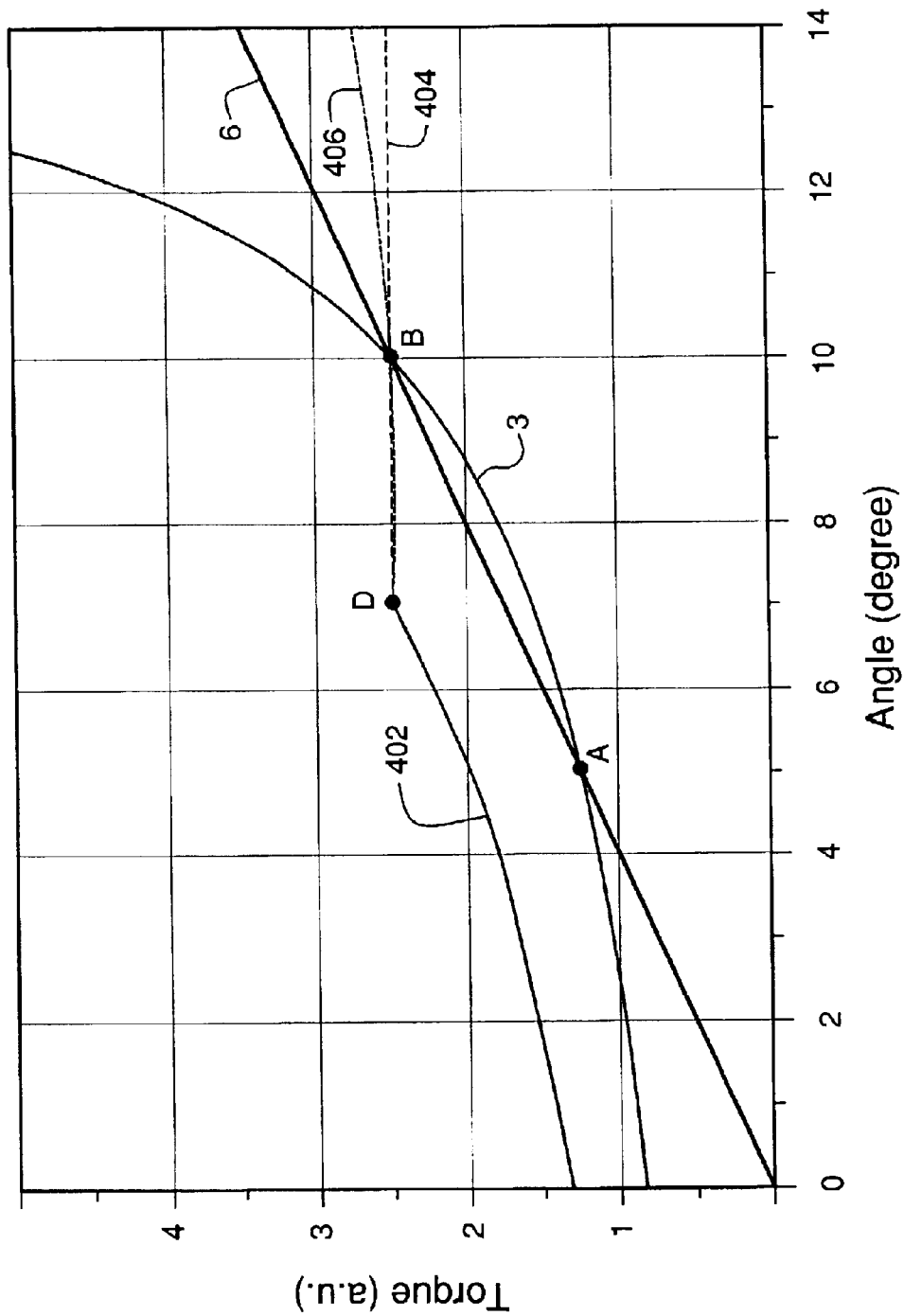
FIG. 4 shows graphically how the mirror in the device of FIG. 1 can be stabilized at a large rotation angle according to one embodiment of the invention.

FIG. 4 shows graphically how mirror 102 of device 100 can be stabilized at a relatively large angle, e.g., θ=$θ_B$, according to one embodiment of the invention. In particular, to stabilize the mirror, device 100 is configured to vary the voltage applied, e.g., to electrode 116*b*, as a function of θ, i.e., V=V(θ). In one configuration, the voltage is varied with the angle such that the resulting electrostatic torque remains constant, e.g., as shown by dashed line 404 in FIG. 4. In another configuration, the voltage is varied linearly with the angle, e.g., according to the following equation:

$$V(θ) = V_3 - r(θ - θ_B) \quad (7)$$

where r is the voltage ramp coefficient. Dotted line 406 in FIG. 4 illustrates the electrostatic torque corresponding to Equation (7). Both configurations result in substantially similar electrostatic torques between points B and D in FIG. 4. As indicated in FIG. 4, mirror 102 can be stabilized at angle $θ_B$ using either configuration because (i) the total torque is zero when θ=$θ_B$ and (ii) the total torque rotates mirror 102 toward $θ_B$ when θ deviates from $θ_B$ in either direction.

In one embodiment, device 100 is configured to vary the voltage applied to electrode 116*b*, for example, as follows. When θ=0, constant voltage $V_5$ is applied to electrode 116*b* to rotate mirror 102. As the angle begins to increase, the electrostatic torque changes according to curve 402 in FIG. 4, which also corresponds to curve 5 in FIG. 3. When θ reaches or exceeds angle $θ_D$ (corresponding to point D in FIG. 4 and given by $θ_D = θ_B - (V_5 - V_3)/r$), the voltage is changed according to Equation (7). Following this voltage profile, mirror 102 can bypass equilibrium angle $θ_A$ (FIGS. 3 and 4) and is stabilized at equilibrium angle $θ_B$. Different parameters and/or different voltage profiles may be used to stabilize mirror 102 at different equilibrium angles. As a result, the available angular range of mirror 102 is extended beyond the snap-down angle ($θ_C$≈7.3 degrees).

Figure 5:
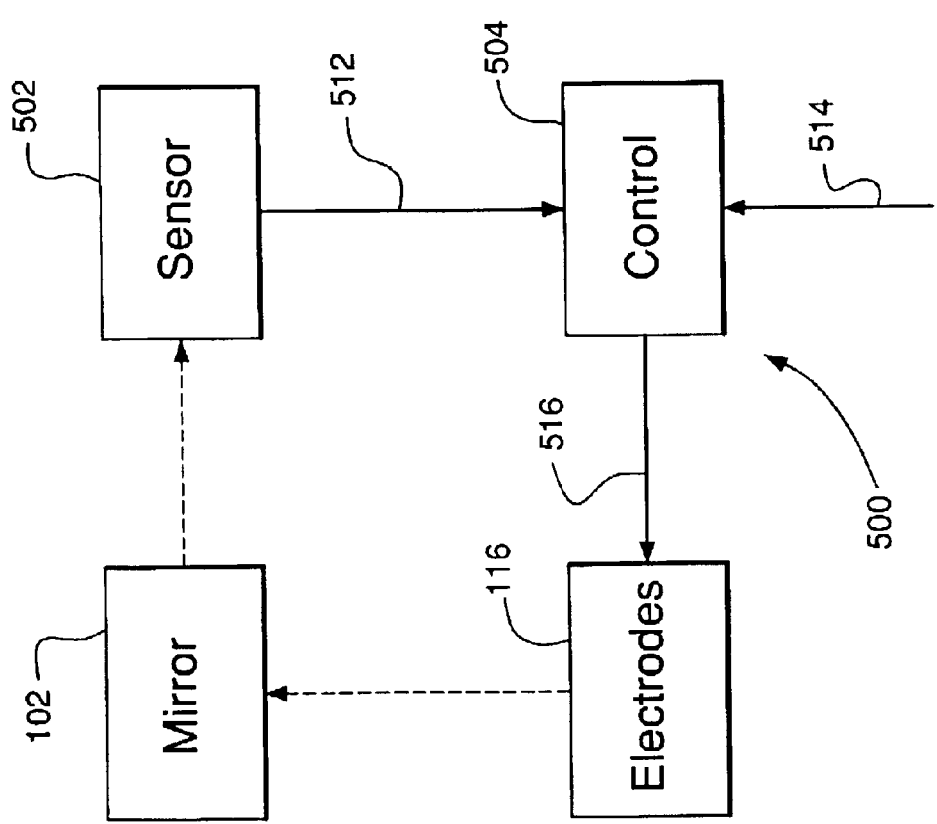
FIG. 5 shows a block diagram of a feedback circuit that can be used to bias the electrodes in the device of FIG. 1 according to one embodiment of the invention.

FIG. 5 shows a feedback circuit 500 that can be used to bias electrodes 116 in device 100 according to one embodiment of the invention. Circuit 500 includes a sensor 502 and a control circuit 504. Sensor 502 is configured to sense the current rotation angle of mirror 102 and generate a signal 512 corresponding to that angle. Signal 512 is preferably a monotonic function of the angle. Sensor 502 may be any suitable sensing device, such as, for example, a capacitive sensor, a piezo-resistive sensor, a piezo-voltage sensor, or a photo-sensor. In one embodiment, sensor 502 is implemented as a four-terminal piezo-voltage torsion sensor disclosed in U.S. Pat. No. 5,648,618, the teachings of which are incorporated herein by reference. Signal 512 is applied to circuit 504, which also receives a signal 514 corresponding to a desired rotation angle. Based on signals 512 and 514, circuit 504 generates a signal 516, which is applied to one of electrodes 116a–b and drives mirror 102 toward the desired rotation angle.

Figure 6:
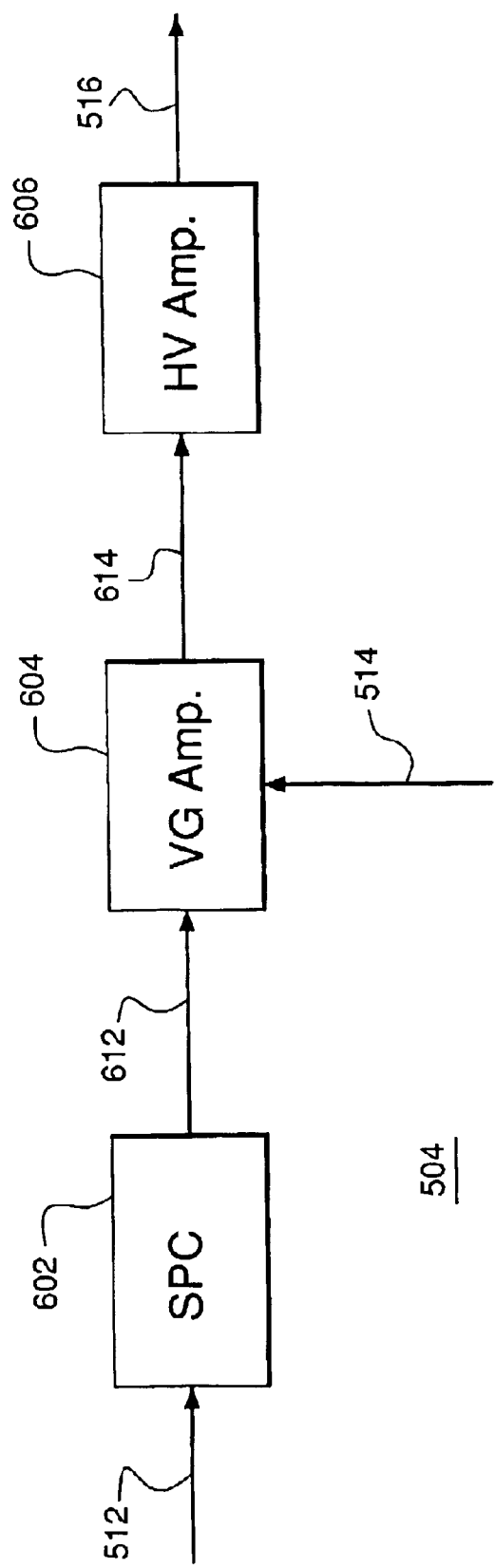
FIG. 6 shows a block diagram of a control circuit that can be used in the feedback circuit of FIG. 5 according to one embodiment of the invention.

FIG. 6 shows control circuit 504 of FIG. 5 according to one embodiment of the invention. The output of sensor 502 (signal 512) is applied to an optional signal processing circuit 602. Alternatively, in a different embodiment, circuit 602 may be part of sensor 502. Based on signal 512, circuit 602 generates a signal 612 preferably of the following form:

$$V_{612} = a_0 - a_1 \theta \qquad (8)$$

where $V_{612}$ is the voltage of signal 612 and $a_0$ and $a_1$ are constants. In one configuration, $a_0$ and $a_1$ are both positive. Alternatively, circuit 602 may be configured with one or both constants negative. Signal 612 is applied to a variable gain amplifier 604, which also receives signal 514 and is designed to generate an amplified signal 614 based on those signals. Signal 614 varies as a function of current angle $\theta$ and the desired equilibrium angle, e.g., $\theta_B$. In one configuration, signal 614 corresponds to curves 402 and 406 of FIG. 4. Signal 614 is applied to a high voltage amplifier 606, which amplifies it to generate signal 516. In one embodiment, amplifier 606 has a constant gain of about 20. In one embodiment, amplifier 604 is implemented as a signal processor, in which case circuit 602 may be removed from circuit 504.

Figure 7:
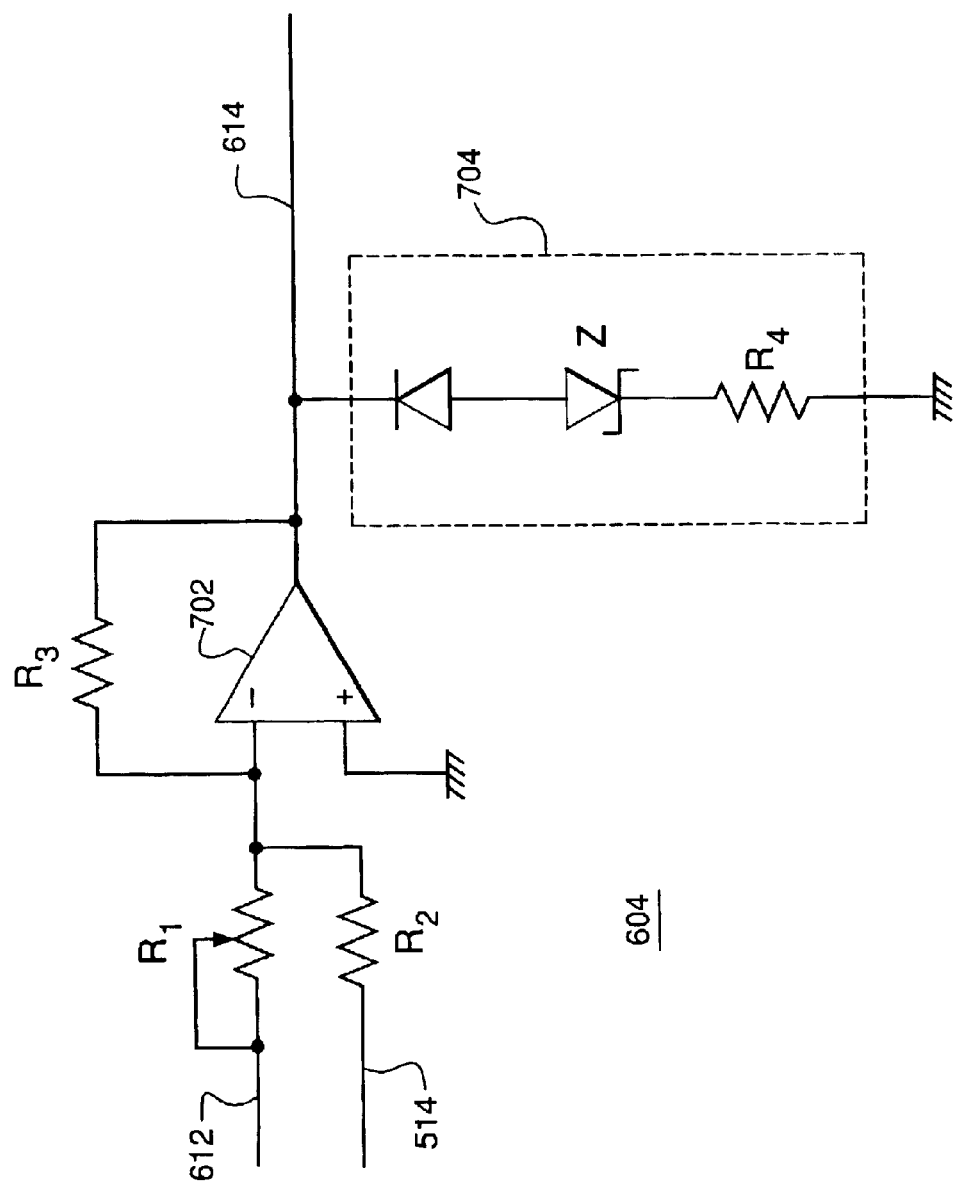
FIG. 7 shows a schematic diagram of a variable gain amplifier that can be used in the control circuit of FIG. 6 according to one embodiment of the invention.

FIG. 7 shows variable gain amplifier 604 of FIG. 6 according to one embodiment of the invention. Amplifier 604 has (i) an operational amplifier (OA) 702 configured as an inverting adder and (ii) a voltage regulator 704. In the absence of regulator 704, the output voltage $V_{702}$ of OA 702 is expressed as follows:

$$V_{702} = -\frac{R_3}{R_1} V_{612} - \frac{R_3}{R_2} V_{514} \qquad (9)$$

where $V_{514}$ is the voltage of signal 514 and $R_i$ are the corresponding resistances in amplifier 604. Combining Equations (8) and (9), one finds that the output of OA 702 is given by the following equation:

$$V_{702} = -\left(\frac{R_3}{R_1} a_0 + \frac{R_3}{R_2} V_{514}\right) + \frac{R_3}{R_1} a_1 \theta \qquad (10)$$

Regulator 704 includes a zener diode (marked Z in FIG. 7), which is configured to operate in the breakdown regime. As a result, the output of OA 702 is clipped when $V_{702}$ is more negative than $V_{704}$, where $V_{704}$ is the base voltage of regulator 704 (voltage drop across the regulator). $V_{704}$ is substantially independent of the output of OA 702 and is related to the breakdown voltage of the zener diode. Consequently, the output voltage of amplifier 604 ($V_{614}$) is given as follows:

$$V_{614} = V_{702} \text{ if } V_{702} \geq V_{704}; \text{ and} \qquad (11a)$$

$$V_{614} = V_{704} \text{ if } V_{702} \geq V_{704} \qquad (11b)$$

In one embodiment, amplifier 604 may be implemented using the following parameters: $R_1 = 650\ \Omega$; $R_2 = R_3 = 4.7\ k\Omega$; $R_4 = 20\ \Omega$; and $V_{704} = -8$ V. In different embodiments, different parameters may be used.

Figure 8A:
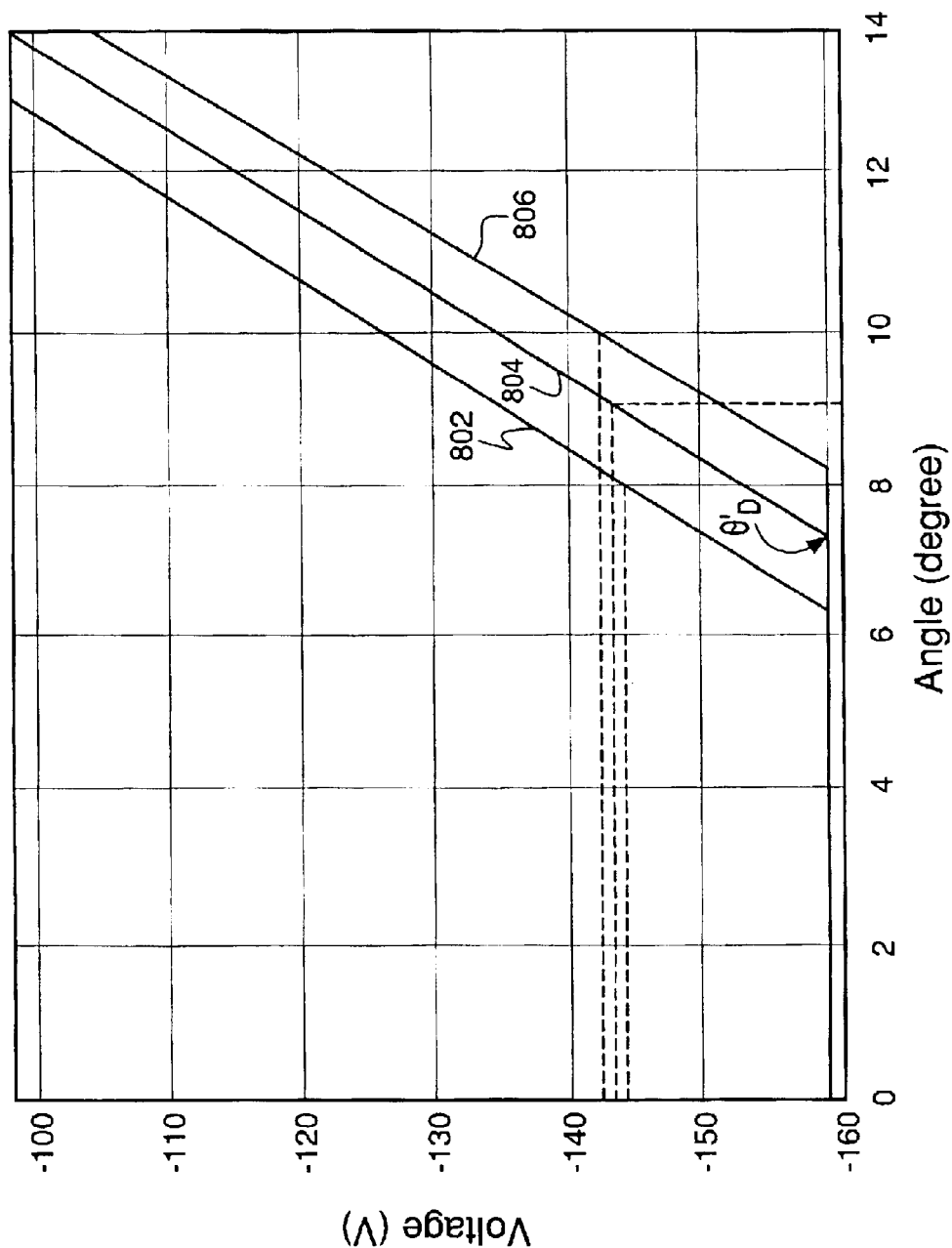
FIGS. 8A–B illustrate representative voltage profiles generated by the control circuit of FIG. 5 using the variable gain amplifier of FIG. 7 according to one embodiment of the invention.
Figure 8B:
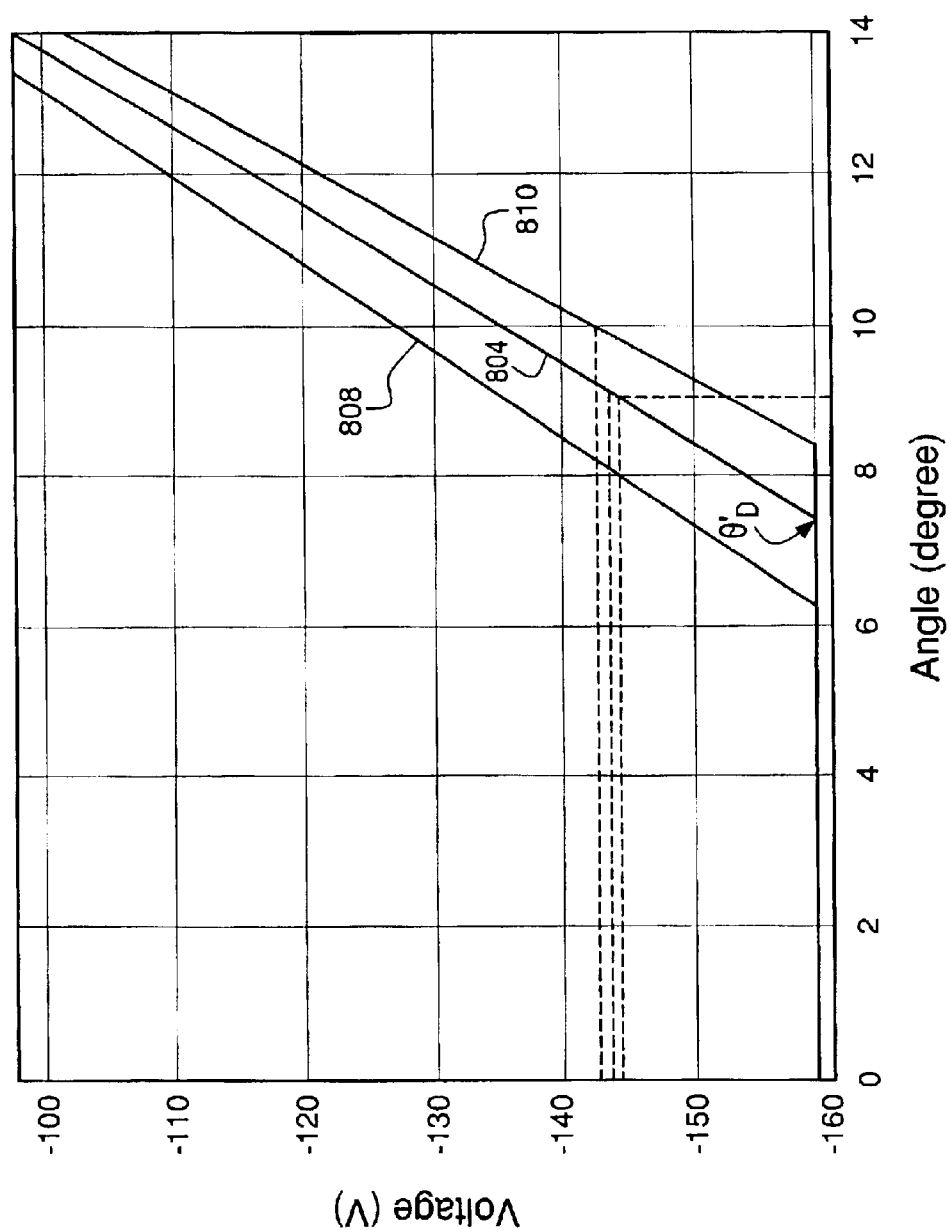

FIGS. 8A–B illustrate representative voltage profiles generated by control circuit 504 of FIG. 6 using amplifier 604 of FIG. 7 and amplifier 606 of FIG. 6 whose gain is set to about 20. More specifically, three voltage profiles 802–806 shown in FIG. 8A correspond to three different values of $V_{514}$. For example, profile 804 corresponds to $V_{514} = 8$ V. In this case, signal 516 is about −160 V, if $\theta < \theta_D$ (FIG. 8A) and increases linearly with the angle, if $\theta \geq \theta_D$. Voltage profile 804 corresponds to the equilibrium angle of about 9 degrees. Similarly, voltage profiles 802 and 806 correspond to equilibrium angles of 8 degrees and 10 degrees, respectively, and each is obtained with the value of $V_{514}$ that is lower and higher than 8 V, respectively.

FIG. 8B illustrates an alternative way of attaining different equilibrium angles using variable gain amplifier 604 of FIG. 7. More specifically, three voltage profiles 804, 808, and 810 shown in FIG. 8B correspond to a fixed value of $V_{514}$ (=8 V) and different settings of variable resistor $R_1$ in amplifier 604 of FIG. 7. For example, profile 804 in FIG. 8B is the same as profile 804 in FIG. 8A and corresponds to $R_1 = 650\ \Omega$. Voltage profiles 808 and 810 are obtained with $R_1$ set to the resistances that are higher and lower than 650 $\Omega$, respectively. Similar to voltage profiles 802 and 806 of FIG. 8A, voltage profiles 808 and 810 of FIG. 8B correspond to equilibrium angles of 8 degrees and 10 degrees, respectively.

The invention may provide one or more of the following benefits. A control circuit of the invention may be used to provide differently shaped voltage profiles to the actuating electrodes. Such profiles may improve stability of operation with respect to noise and increase the switching speed between two different mirror positions. The switching speed increase is due to a relatively large voltage driving the mirror at low tilt angles, which results in faster mirror rotation. In addition, using the angle-dependent driving voltage may help to damp mirror oscillations near an equilibrium angle. Having fewer oscillations at the equilibrium angle increases the switching speed due to a faster mirror settling time. Furthermore, the invention extends the available angular range of MEMS mirrors beyond the snap-down angle. As a result, the number of MEMS devices that can be arrayed in an optical cross-connect may be substantially increased.

While this invention has been described with reference to illustrative embodiments, this description is not intended to be construed in a limiting sense. Various position sensors may be interfaced with a control circuit of the invention. In certain embodiments, the control circuit and/or sensor may be integrated into a MEMS device analogous to device 100. Depending on the sensor, different voltage profiles may be generated and applied to the actuating electrodes. The voltages may be positive or negative. A desired angle of rotation may be specified by providing a reference electrical signal (e.g., signal 514) to a variable gain amplifier of the control circuit or adjusting a variable resistor in said amplifier, or both. Also, a MEMS device configured with a feedback circuit of the invention may be implemented in wafers different from SOI wafers. In a MEMS device configured with a two-axis mirror, two feedback circuits may be used, one for each axis. Furthermore, a feedback circuit of the invention may be used with MEMS devices different from MEMS mirrors and/or applied to control translation as well as rotation. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. Apparatus, comprising:
   a MEMS device; and
   a controller adapted to:
   receive, from a position sensor corresponding to the MEMS device, a sensor signal indicative of a current position of a movable part of the MEMS device with respect to a stationary part of the MEMS device; and
   generate a control signal as a function of the sensor signal, wherein an actuator of the MEMS device is adapted to achieve a desired position of the movable part with respect to the stationary part based on the control signal, wherein the control signal has a voltage profile, wherein a first portion of the voltage profile has voltage having an absolute value greater than a snap-down voltage for the MEMS device.

2. The invention of claim 1, wherein a second portion of the voltage profile has voltage varying substantially linearly with a current rotation angle between the movable and stationary parts.

3. The invention of claim 1, wherein a second portion of the voltage profile has voltage corresponding to a substantially constant electrostatic torque applied to the movable part with respect to the stationary part.

4. The invention of claim 1, wherein the MEMS device forms part of an optical switch.

5. Apparatus, comprising
   a MEMS device; and
   a controller adapted to:
   receive, from a position sensor corresponding to the MEMS device, a sensor signal indicative of a current position of a movable part of the MEMS device with respect to a stationary part of the MEMS device; and
   generate a control signal as a function of the sensor signal, wherein an actuator of the MEMS device is adapted to achieve a desired position of the movable part with respect to the stationary part based on the control signal, wherein:
   the movable part is rotatably coupled to the stationary part;
   the sensor signal is indicative of a current rotation angle between the movable and stationary parts;
   the control signal is a function of the current rotation angle;
   the desired position corresponds to an equilibrium rotation angle between the movable and stationary parts; and
   the control circuit is adapted to generate the control signal based on the sensor signal and a reference signal corresponding to the equilibrium rotation angle.

6. The invention of claim 5, wherein an adjustment of the reference signal corresponds to a change in the equilibrium rotation angle.

7. The invention of claim 5, wherein the equilibrium rotation angle is greater than or substantially equal to a snap-down angle for the MEMS device.

8. The invention of claim 5, wherein the MEMS device forms part of an optical switch.

9. The invention of claim 5, wherein the control circuit comprises a first amplifier adapted to:
   receive the reference signal and a fourth signal based on the sensor signal; and
   generate a fifth signal, wherein the control signal is based on the fifth signal.

10. The invention of claim 9, wherein the fourth signal is a substantially linear function of the current rotation angle.

11. The invention of claim 9, wherein the control circuit further comprises a second amplifier adapted to amplify the fifth signal to generate the control signal.

12. The invention of claim 9, wherein the first amplifier comprises:
    an operational amplifier adapted to operate as an inverting adder; and
    a voltage regulator connected to an output of the operational amplifier, wherein:
    the operational amplifier is adapted to receive the reference and fourth signals; and
    the fifth signal is a regulated output signal of the operational amplifier.

13. The invention of claim 12, wherein the voltage regulator is adapted to clip the output signal of the operational amplifier if the output signal is more negative than a base voltage of the voltage regulator.

14. Apparatus, comprising:
    means for receiving, from a position sensor corresponding to a MEMS device, a sensor signal indicative of a current rotation anile between a movable part of the MEMS device and a stationary part of the MEMS device; and
    means for generating a control signal based on the sensor signal and a reference signal, wherein:
    the movable part is rotatably coupled to the stationary part;
    the control signal is a function of the current rotation angle;
    the reference signal corresponds to an equilibrium rotation angle between the movable and stationary parts;
    an actuator of the MEMS device achieves the equilibrium rotation angle based on the control signal; and
    the equilibrium rotation angle is greater than or substantially equal to a snap-down angle for the MEMS device.

15. Apparatus, comprising:
    means for receiving, from a position sensor corresponding to a MEMS device, a sensor signal indicative of a current rotation angle between a movable part of the MEMS device and a stationary part of the MEMS device; and
    means for generating a control signal based on the sensor signal and a reference signal, wherein:
    the movable part is rotatably coupled to the stationary part;
    the control signal is a function of the current rotation angle;
    the reference signal corresponds to an equilibrium rotation angle between the movable and stationary parts;

an actuator of the MEMS device achieves the equilibrium rotation angle based on the control signal; and means for adjusting the reference signal to change the equilibrium rotation angle.

16. A method comprising:

receiving, from a position sensor corresponding to a MEMS device, a sensor signal indicative of a current rotation angle between a movable part of the MEMS device and a stationary part of the MEMS device; and generating a control signal based on the sensor signal and a reference signal, wherein:

the movable part is rotatably coupled to the stationary part;

the control signal is a function of the current rotation angle;

the reference signal corresponds to an equilibrium rotation angle between the movable and stationary parts; and an actuator of the MEMS device achieves the equilibrium rotation angle based on the control signal; and adjusting the reference signal to change the equilibrium rotation angle.

17. The invention of claim 16, wherein the MEMS device forms part of an optical switch.

18. A method comprising:

receiving, from a position sensor corresponding to a MEMS device, a sensor signal indicative of a current rotation angle between a movable part of the MEMS device and a stationary part of the MEMS device; and generating a control signal based on the sensor signal and a reference signal, wherein:

the movable part is rotatably coupled to the stationary part;

the control signal is a function of the current rotation angle;

the reference signal corresponds to an equilibrium rotation angle between the movable and stationary parts;

an actuator of the MEMS device achieves the equilibrium rotation angle based on the control signal; and the equilibrium rotation angle is greater than or substantially equal to a snap-down angle for the MEMS device.

19. The invention of claim 18, wherein the MEMS device forms part of an optical switch.

* * * * *

UNITED STATES PATENT AND TRADEMARK OFFICE
CERTIFICATE OF CORRECTION

PATENT NO. : 6,768,571 B2
DATED : July 27, 2004
INVENTOR(S) : Azarov et al.

It is certified that error appears in the above-identified patent and that said Letters Patent is hereby corrected as shown below:

Column 8,
Line 36, please replace "current rotation anile" with -- current rotation angle --.

Signed and Sealed this

Seventh Day of December, 2004

JON W. DUDAS
*Director of the United States Patent and Trademark Office*